(12) United States Patent
Takagi

(10) Patent No.: US 6,965,758 B2
(45) Date of Patent: Nov. 15, 2005

(54) DIGITAL BROADCAST/ANALOG BROADCAST RECEIVING APPARATUS

(75) Inventor: Toshihiro Takagi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 272 days.

(21) Appl. No.: 10/623,422

(22) Filed: Jul. 18, 2003

(65) Prior Publication Data

US 2004/0038704 A1    Feb. 26, 2004

(30) Foreign Application Priority Data

Aug. 22, 2002    (JP)    ............... P2002-241564

(51) Int. Cl.[7] .................................. H04B 1/18
(52) U.S. Cl. .................. 455/154.1; 455/154.1; 455/154.2; 455/158.1; 455/158.22
(58) Field of Search .............. 455/154.1, 158.1, 455/158.2, 158.4, 154.2, 3.01

(56) References Cited

U.S. PATENT DOCUMENTS 5,842,119 A * 11/1998 Emerson et al. ......... 455/161.3

2003/0148731 A1 * 8/2003 Onomatsu et al. ......... 455/3.06

FOREIGN PATENT DOCUMENTS

| JP | 5-328322 | 12/1993 | ............ H04N 7/08 |
| JP | 11-27598 | 1/1999 | .......... H04N 5/445 |

OTHER PUBLICATIONS

Patent Abstracts of Japan, Publication No. 05-328322, dated Dec., 10, 1993, 2 pages.
Patent Abstracts of Japan, Publication No. 11-027598, dated Jan., 29, 1999, 2 pages.

* cited by examiner

Primary Examiner—Sonny Trinh
Assistant Examiner—Dung Lam
(74) Attorney, Agent, or Firm—Osha Liang LLP

(57) ABSTRACT

A time information acquisition channel setting screen includes a channel number display window, a scan state display window and a command window. A channel time information of each channel as well as channel numbers of each channel are displayed in the channel number display window. While viewing the channel numbers and the channel time information, a viewer operates a cursor and selects a channel for updating internal time information.

8 Claims, 3 Drawing Sheets

DIGITAL BROADCAST/ANALOG BROADCAST RECEIVING APPARATUS

BACKGROUND OF THE INVENTION

1. Field of the Invention

The present invention relates to a digital broadcast/analog broadcast receiving apparatus for receiving a digital broadcast signal and an analog broadcast signal and outputting a video signal and a sound signal, and particularly to a digital broadcast/analog broadcast receiving apparatus that updates internal time information thereof based on channel time information of the received channel.

2. Description of the Related Art

A conventional digital broadcast/analog broadcast receiving apparatus includes a circuit for receiving a digital broadcast signal and a circuit for receiving an analog broadcast signal, and when a channel selected is of a digital broadcast, the circuit for digital broadcast is used to convert the digital broadcast signal and outputs a video signal and a sound signal of an analog mode. When the channel selected is of an analog broadcast, the circuit for analog broadcast signal is used to output a video signal and a sound signal of the analog mode.

The digital broadcast/analog broadcast receiving apparatus is equipped with an RTC, which is time control means for controlling internal time information of the apparatus. Based on the internal time information, a timer function such as an automatic power ON function for turning on a power source at a preset time or an automatic switch OFF function for turning off a power source at a preset time works.

However, the RTC that is equipped within the apparatus cannot measure time accurately, and there is also an RTC in which an error of several seconds per day is caused. Therefore, the digital broadcast/analog broadcast receiving apparatus acquires time information (channel time information) inserted into a digital broadcast signal or an analog broadcast signal received and updates time information (internal time information) of the RTC.

In terrestrial broadcast of North America, the digital broadcast signal delivers a difference value between GPS time and UTC time and time information in a GPS format by PSIP information (program information and system information for multiplexing a transport stream) compliant with A65 standard. The digital broadcast/analog broadcast receiving apparatus converts the time information in the GPS format into time information in a UTC format and updates the internal time information of the RTC. Also, the analog broadcast signal delivers time information in a UTC format superposed within the twenty-first scan line (LINE 21) of the video signal compliant with EIA-608 regulation. The digital broadcast/analog broadcast receiving apparatus acquires the time information in the UTC format and updates the time information of the RTC.

However, among digital broadcasts and analog broadcasts which the digital broadcast/analog broadcast receiving apparatus can receive, there are channels in which time information is not included at all or channels such as test stream that delivers time information in which totally different time from the actual time.

Since the digital broadcast/analog broadcast receiving apparatus updates time information of the RTC based on channel time information included in the channel received, when a channel selected includes time information that is not accurate, the time information of the RTC is updated by the inaccurate time information. As a result, time at which a viewer wants the apparatus to be powered ON/OFF differs from time at which the apparatus actually acts.

For example, in the case of making a viewing reservation or a recording reservation using EPG (Electronic Program Guide), due to the difference between the time information of the RTC and the actual time, the viewing reservation or the recording reservation may not be made as the viewer desires.

In the conventional digital broadcast/analog broadcast receiving apparatus, even when a viewer selects a channel for acquiring time information, the channel number selected is only displayed, so that the viewer does not see whether or not the selected channel includes accurate time information, and cannot select a time information setting channel easily.

Various digital broadcast/analog broadcast receiving apparatus have been proposed conventionally, and there are techniques disclosed in Japanese unexamined patent publications JP-A-5-328322 and JP-A-11-027598. However, no method for solving the problem described above is disclosed in the publications.

SUMMARY OF THE INVENTION

It is therefore an object of the invention to provide a digital broadcast/analog broadcast receiving apparatus that a viewer can simply set a channel for acquiring time information arbitrarily and capable of setting the channel while checking whether or not each of the channel includes accurate time information.

In order to achieve the object, according to a first aspect of the invention, there is provided a digital broadcast/analog broadcast receiving apparatus that detects each channel time information included in a channel capable of reception and generates and outputs a first channel list for displaying the channel capable of reception and a second channel list for displaying only a channel including the channel time information. The apparatus also control a display device connected thereto to display a channel including the channel time information on the first channel list so as to differ from the other channels and updates internal time information based on channel time information of a channel selected from the first channel list.

According to the first aspect of the invention, the viewer can easily check all the channels capable of reception and also can easily check a channel for updating the internal time information.

In addition, the viewer can easily distinguish a channel including the channel time information, so that it becomes easy to select the channel including the channel time information as the channel for updating the internal time information.

According to a second aspect of the invention, in addition to the first aspect of the invention, the control section displays an indication that indicates each of the channels is whether of a digital broadcast or of an analog channel onto the screen.

According to the second aspect of the invention, the viewer can easily distinguish a broadcast state as to whether the channel selected is of the digital broadcast or of the analog broadcast, and can obtain the channel time information from a broadcast format of the viewer's preference.

According to a third aspect of the invention, in addition to the first aspect of the invention, the control section displays the channel time information on the first channel list.

According to a fourth aspect of the invention, in addition to the first aspect of the invention, the control section generates and outputs to the display device a display field for separately displaying the channel time information of a channel selected from the first channel list.

According to the third and fourth aspect of the invention, the viewer can easily recognize the channel time information of the selected channel, and can recognize that the selected channel includes accurate time information.

According to a fifth aspect of the invention, in addition to the fist aspect of the invention, the control section compensates each of the channel time information acquired based on daylight saving time information and regional time difference information.

According to the fifth aspect of the invention, the viewer can obtain accurate time information regardless of a region viewing.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

A digital broadcast/analog broadcast receiving apparatus according to an embodiment of the invention will be described with reference to the drawings.

Figure 1:
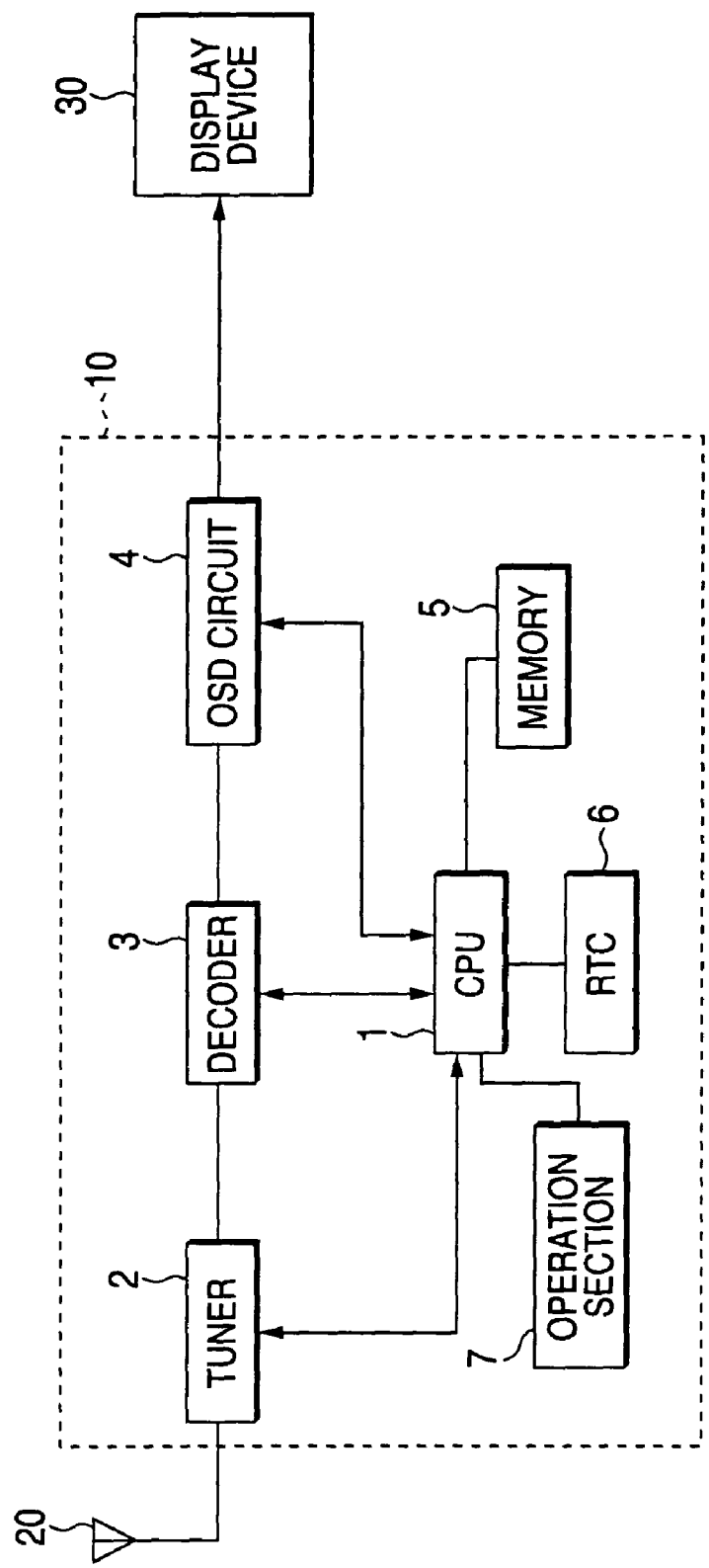
FIG. 1 is a block diagram showing a main part of a digital broadcast/analog broadcast receiving apparatus according to an embodiment of the invention.

FIG. 1 is a block diagram showing a main part of the digital broadcast/analog broadcast receiving apparatus according to the embodiment of the invention.

The digital broadcast/analog broadcast receiving apparatus 10 includes a tuner 2 (receive section), a decoder 3, an OSD (On Screen Display) circuit 4, an operation section 7, a CPU 1, a memory 5 and an RTC (Real Time Clock) 6, which corresponds to an internal time control section of the invention, connected to the CPU 1. The CPU 1 and the OSD circuit 4 corresponds to a control section of the invention. The tuner 2 includes a digital broadcast signal receiving section and an analog broadcast signal receiving section, and can simultaneously receive a digital broadcast signal and an analog broadcast signal. The decoder 3 includes a digital decoder section and an analog decoder section, and decodes the digital broadcast signal by the digital decoder section when a channel selected is of a digital broadcast, and decodes the analog broadcast signal by the analog decoder section when the channel selected is of a analog broadcast.

When a viewer selects a channel on which a desired program is broadcast using the operation section 7 such as a remote control unit, a selection signal is transmitted from the operation section 7 to the CPU 1. The CPU 1 controls the tuner 2 so as to extract the corresponding channel. When the selected channel is of a digital broadcast, the tuner 2 extracts the digital broadcast signal (received by an antenna 20) of the channel on which the selected program is broadcast and when the selected channel is of the analog broadcast, the tuner 2 extracts the analog broadcast signal (received by the antenna 20) of the channel on which the selection program is broadcast and outputs the signal to the decoder 3. The decoder 3 decodes the digital broadcast signal or the analog broadcast signal inputted. A video signal and a sound signal obtained by decoding the digital broadcast signal and the analog broadcast signal by the decoder 3 are outputted to a display device 30 through the OSD circuit 4.

In a case of displaying time on a screen of the display device 30, the CPU 1 acquires internal time information from the RTC 6 and generates a time image signal and outputs the signal to the OSD circuit 4. The OSD circuit 4 combines the time image signal with the video signal.

In a case of actuating a timer function, the CPU 1 actuates the timer function at the preset time based on time (internal time information) measured by the RTC 6.

Hereinafter, an adjusting (updating) method of the internal time information of the RTC 6 will be described.

Figure 2:
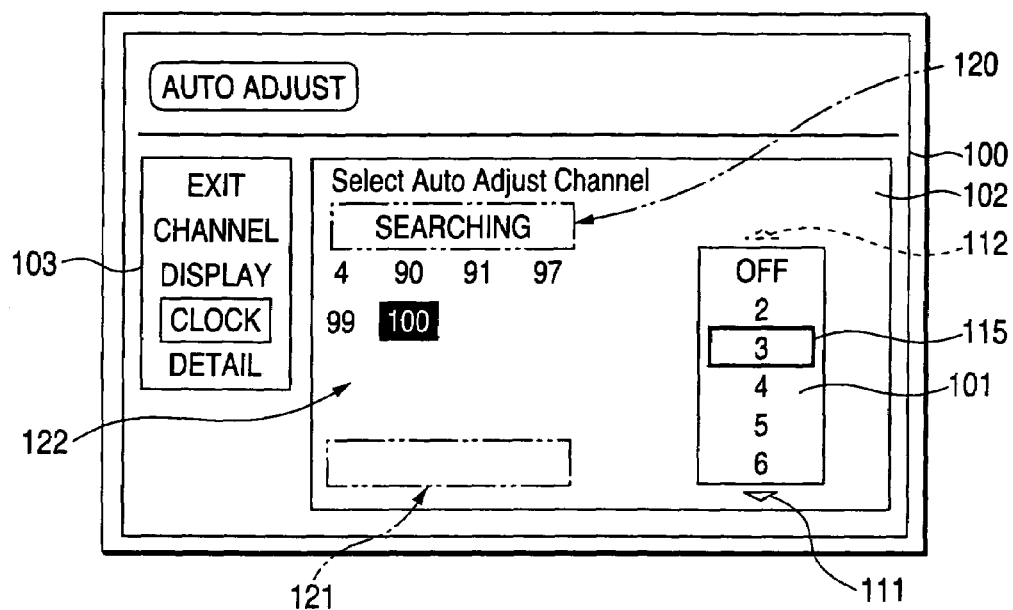
FIG. 2 is a diagram showing a configuration example of a time information acquisition channel decision screen.

FIG. 2 is a diagram showing a configuration example of a time information acquisition channel decision screen.

The internal time information of the RTC 6 is automatically adjusted at time intervals or at the time preset on another screen, and when the set time is reached, a broadcast signal of a channel set using the screen shown in FIG. 2 is received and channel time information is acquired.

When the channel set is the digital broadcast signal (ATSC mode), time information in a GPS format and a difference value between the time information in the GPS format and time information in a UTC format are acquired from PSIP information included in a transport stream and based on these, the time information in the UTC format is calculated. Thereafter, the time information in the UTC format is corrected based on correction information of D.S.T. (Daylight Saving Time) and regional time difference information. The channel time information thus obtained is updated as the time information (internal time information) of the RTC 6.

When the channel set is the analog broadcast signal (NTSC mode), time information in the UTC format is acquired from LINE 21 of the analog broadcast signal, and the time information in the UTC format is corrected using correction information of D.S.T. and regional time difference information. The time information thus obtained is updated as the time information (internal time information) of the RTC 6.

As shown in FIG. 2, a time information acquisition channel setting screen 100 includes a channel number display window 101 for displaying channel numbers which the present apparatus can currently receive, a scan state display window 102 for displaying a scan state of a channel including channel time information, and a command window 103 for showing a command list.

The images to display onto the screen of the display device 30 are stored in the memory 5 and when the viewer makes setting for updating time information using the operation section 7, the CPU 1 receives the operation command input from the operation section 7 and reads a time information acquisition channel setting image out of the memory 5 and switches from the video signal and outputs the image to the display device 30.

In the channel number display window 101, "OFF" and all channel numbers of channels, which the apparatus can receive as specifications regardless of whether or not a program is currently broadcast, are displayed. Also, an arrow 111 indicating that there are channels of channel numbers larger than the channel numbers currently displayed is displayed below the channel number display window 101. By selecting the arrow 111, the channel number next larger than the channel numbers currently displayed is displayed in the channel display window 101. Incidentally, in FIG. 2, five channels are displayed from the smallest channel number, so that only the arrow 111 is displayed. However, when the arrow 111 is operated and larger channel numbers (for example, "9, 10, 11, 12, 13, 14") are displayed, an arrow 112 is displayed above the channel number display window 101. When the arrow 112 is selected, the channels having smaller channel numbers are displayed.

Also, when a channel including channel time information is detected in the channel number display window 101, a channel number of the channel is displayed so as to differ from the other channel numbers. For example, only the channel comprising channel time information is blinked or is displayed by a different color.

A cursor 115 is displayed in the channel number display window 101. When the viewer moves the cursor 115, the channel selected is changed.

The scan state display window 102 includes a display part 120 for displaying a message that a scan is being executed, a display part 121 for displaying a message that the scan is completed, and a scan state display part 122 for displaying a current scan state.

The scan state display part 122 displays a channel number in which the CPU 1 is currently scanning and channel numbers comprising channel time information based on a result scanned, and the channel number in the scanning is displayed so as to differ from the other channel numbers. For example, as shown in FIG. 2, only the channel number in the scanning is reversely displayed. Further, in the case of currently being in scanning, a message indicates the scanning is displayed in the display part 120 and when the scanning of all the channels is completed, a message indicates that the scanning is completed is displayed in the display part 121.

When the viewer operates the operation section 7 and selects a channel number displayed while viewing the time information acquisition channel setting screen 100, it is set so as to acquire channel time information of the selected channel at the set time described above. The set contents are stored in the memory 5, and the CPU 1 acquires the channel time information at the set time and updates the internal time information of the RTC.

According to above described configuration, the viewer can view all the channel numbers that the present apparatus can receive, and can arbitrarily and easily select a channel for acquiring the channel time information for updating the internal time information of the RTC from the available channels.

Also, since a distinction between a channel on which the channel time information is not delivered and a channel on which the channel time information is delivered at the current point in time can be made, the channel on which the channel time information is delivered can be selected surely.

Hereinafter, a second configuration example (display example) of the time information acquisition channel setting screen 100 will be described with reference to FIG. 3.

Figure 3:
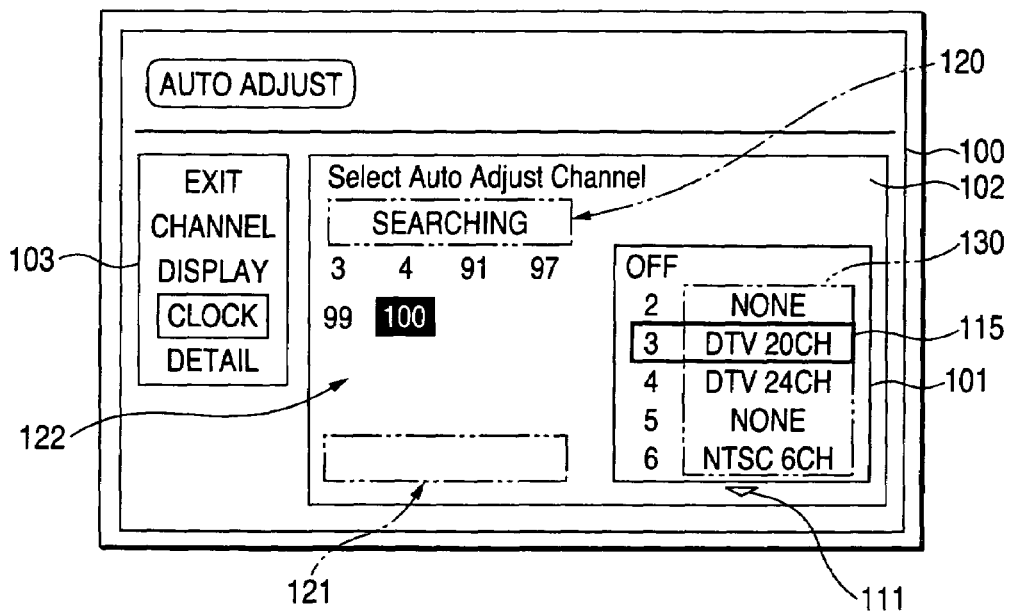
FIG. 3 is a diagram showing a second configuration example of the time information acquisition channel setting screen.

FIG. 3 is a diagram showing a second configuration example of the time information acquisition channel setting screen 100.

The time information acquisition channel setting screen 100 shown in the second configuration example includes a channel content display part 130 for indicating the contents of each channel number together with channel numbers in the channel number display window 101, and the other configurations are the same configurations as the time information acquisition channel setting screen shown in FIG. 2.

The channel number display window 101 includes channel numbers and "OFF", and the channel content display part 130 for indicating whether each channel is digital broadcast or analog broadcast and indicating an actual channel number.

Based on scan results of the CPU 1, the channel content display part 130 displays "NONE" when it is not broadcast, and displays a broadcast format and an actual channel number when it is broadcast.

For example, as shown in FIG. 3, in a channel number 2, it is not broadcast currently, so that "NONE" is displayed and in a channel number 6, a channel 6 of analog broadcast is broadcast currently, so that "NTSC 6CH" is displayed. Also, in a channel number 3, a channel 20 of digital broadcast DTV is broadcast currently by allocating the channel number 3 as a virtual channel, so that "DTV 20CH" is displayed.

According to above described configuration, the viewer can arbitrarily select a channel for acquiring the channel time information while checking an actual broadcast state of each the channel and further, can easily select a channel of a broadcast format of the viewer's preference.

Hereinafter, a third configuration example (display example) of the time information acquisition channel setting screen 100 will be described with reference to FIG. 4.

Figure 4:
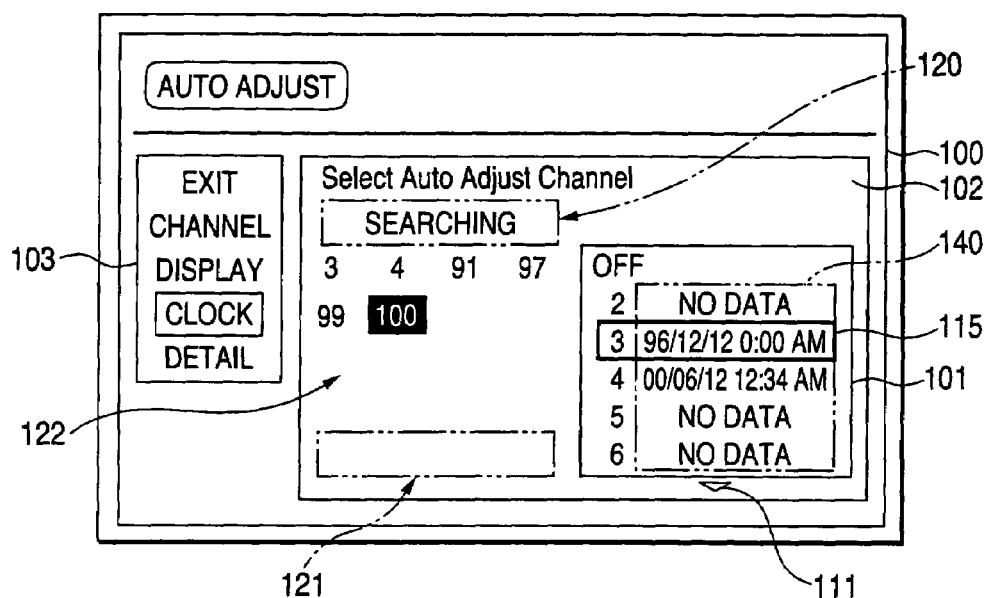
FIG. 4 is a diagram showing a third configuration example of the time information acquisition channel setting screen.

FIG. 4 is a diagram showing the third configuration example of the time information acquisition channel setting screen 100.

The time information acquisition channel setting screen 100 shown in the third configuration example includes a channel time information display part 140 for indicating channel time information about each channel number together with channel numbers in the channel number display window 101, and the other configurations are the same configurations as the time information acquisition channel setting screen shown in FIG. 2.

Based on scan results of the CPU 1, the channel time information display part 140 displays "NONE" when channel time information cannot be acquired, and displays the channel time information when the channel time information is acquired.

For example, as shown in FIG. 4, in a channel number 2, the channel time information cannot be acquired currently, so that "NONE" is displayed and in channel numbers 3, 4, each the channel time information is acquired currently, so that each the channel time information is displayed as "Dec. 12, 1996 0:00AM" for the channel 3 and "Jun. 12, 2002 12:34AM" for the channel 4. In the displayed channel time information, time information in which the conversion and correction described above are made is displayed.

When it is assumed that the current time is "Jun. 12, 2002 12:34AM", a viewer can easily recognize that the channel time information of the channel 4 is accurate. Also, the viewer can easily recognize that the channel 3 is a channel such of a test stream and does not include accurate time information.

According to above described configuration, the viewer can easily recognize channel number including accurate time information, so that the viewer can easily select a channel including exact time information as a channel for updating the time information of the RTC 6.

Figure 5:
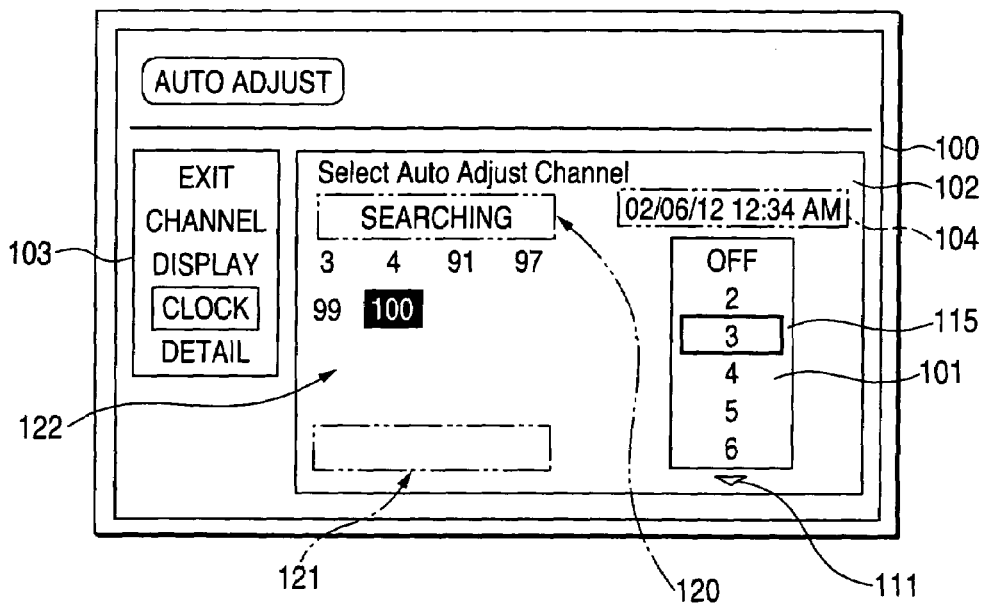
FIG. 5 is a diagram showing a fourth configuration example of the time information acquisition channel setting screen.

Incidentally, in FIG. 4, the channel time information of each the channel has been displayed in the side of the channel number in the channel number display window 101, but as shown in FIG. 5, a channel time information display window 104 for displaying channel time information of a channel selected by a cursor 115 may be provided in a position different from the channel number display window 101 to check the channel time information by the window 104.

As described above with reference to specific preferred embodiment, according to the digital broadcast/analog broadcast receiving apparatus of the invention, the viewer can easily check all the channels capable of reception and can arbitrarily and easily select a channel for updating internal time information and also can easily distinguish a channel including channel time information. As a result, the viewer can easily select the channel including the channel time information as the channel for updating the internal time information to meet the viewer's preference.

According to the digital broadcast/analog broadcast receiving apparatus of the invention, the viewer can easily distinguish the broadcast state as to whether a channel selected is digital broadcast or analog broadcast, so that the viewer can easily obtain channel time information from a channel of a broadcast format of the viewer's preference.

According to the digital broadcast/analog broadcast receiving apparatus shown in the invention, the viewer can easily recognize channel time information of a channel selected, so that it becomes easy to set a channel including accurate time information to the channel selected.

According to the digital broadcast/analog broadcast receiving apparatus shown in the invention, the viewer can select a channel for updating internal time information while viewing accurate time information regardless of a region viewing.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A digital broadcast/analog broadcast receiving apparatus comprising:
   a receive section adapted to receive a digital broadcast signal and a analog broadcast signal;
   an internal time control section adapted to count an internal time information; and
   a control section adapted to update the internal time information based on a channel time information included in a broadcast signal of a selected channel,
   wherein the control section detects each of the channel time information included in a channel capable of reception and displays the channel capable of reception onto a screen of a display device connected thereto,
   wherein the control section generates and outputs to the display device a first channel list for displaying a channel including the channel time information so as to differ from other channels and a second channel list for displaying only a channel including the channel time information,
   wherein the control section displays an indication that indicates each of the channel is whether of a digital broadcast or of a analog channel onto the screen, and
   wherein the control section updates the internal time information based on the channel time information of a channel selected from the first channel list.

2. A digital broadcast/analog broadcast receiving apparatus comprising:
   a receive section adapted to receive a digital broadcast signal and a analog broadcast signal;
   an internal time control section adapted to count an internal time information; and
   a control section adapted to update the internal time information based on a channel time information included in a broadcast signal of a selected channel,
   wherein the control section detects each of the channel time information included in a channel capable of reception and displays the channel capable of reception onto a screen of a display device connected thereto,
   wherein the control section generates and outputs to the display device a first channel list for displaying a channel including the channel time information so as to differ from other channels and a second channel list for displaying only a channel including the channel time information,
   wherein the control section compensates each of the channel time information acquired based on daylight saving time information and regional time difference information and displays the compensated channel time information on the first channel list or in a display field for separately displaying the channel time information onto the screen, and
   wherein the control section updates the internal time information based on the channel time information of a channel selected from the first channel list.

3. A digital broadcast/analog broadcast receiving apparatus comprising:
   a receive section adapted to receive a digital broadcast signal and a analog broadcast signal;
   an internal time control section adapted to count an internal time information; and
   a control section adapted to update the internal time information based on a channel time information included in a broadcast signal of a selected channel,
   wherein the control section detects each of the channel time information included in a channel capable of reception and displays the channel capable of reception onto a screen of a display device connected thereto,
   wherein the control section generates and outputs to the display device a first channel list for displaying a channel including the channel time information so as to differ from other channels, and
   wherein the control section updates the internal time information based on the channel time information of a channel selected from the first channel list.

4. The apparatus as claimed in claim 3, wherein the control section generates a second channel list for displaying only a channel including the channel time information.

5. The apparatus as claimed in claim 4, wherein the control section displays an indication that indicates each of the channels is whether of a digital broadcast or of an analog channel onto the screen.

6. The apparatus as claimed in claim 3, wherein the control section displays the channel time information on the first channel list.

7. The apparatus as claimed in claim 3, wherein the control section generates and outputs to the display device a display field for separately displaying the channel time information of a channel selected from the first channel list.

8. The apparatus as claimed in any one of claims 6 and 7, wherein the control section compensates each of the channel time information acquired based on daylight saving time information and regional time difference information.

* * * * *